US012012305B2

(12) United States Patent
Bizzozero

(10) Patent No.: US 12,012,305 B2
(45) Date of Patent: Jun. 18, 2024

(54) METHOD FOR BUILDING AN ELEVATOR SYSTEM, AND ELEVATOR SYSTEM SUITABLE FOR CARRYING OUT THE METHOD

(71) Applicant: Inventio AG, Hergiswil (CH)

(72) Inventor: Gabriele Bizzozero, Gisikon (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 18/002,278

(22) PCT Filed: Jun. 23, 2021

(86) PCT No.: PCT/EP2021/067070
§ 371 (c)(1),
(2) Date: Dec. 19, 2022

(87) PCT Pub. No.: WO2021/259969
PCT Pub. Date: Dec. 30, 2021

(65) Prior Publication Data

US 2023/0339727 A1 Oct. 26, 2023

(30) Foreign Application Priority Data

Jun. 26, 2020 (EP) .................................... 20182623

(51) Int. Cl.
*B66B 19/04* (2006.01)
*B66B 19/02* (2006.01)

(52) U.S. Cl.
CPC .............. *B66B 19/04* (2013.01); *B66B 19/02* (2013.01)

(58) Field of Classification Search
CPC ..... B66B 19/005; B66B 19/002; B66B 19/04; B66B 19/00
See application file for complete search history.

(56) References Cited

U.S. PATENT DOCUMENTS 8,881,872 B2 * 11/2014 Peacock .................. B66B 19/00 29/469
9,809,424 B2 * 11/2017 Peacock .................. B66B 19/00

FOREIGN PATENT DOCUMENTS

CN 105073621 A * 11/2015 ............. B66B 19/00
CN 115038660 A * 9/2022 ......... B66B 11/0045
(Continued)

OTHER PUBLICATIONS

Machine Translation of WO 2015/003965.*

*Primary Examiner* — Diem M Tran
(74) *Attorney, Agent, or Firm* — Williams J. Clemens; Shumaker, Loop & Kendrick, LLP

(57) ABSTRACT

Method for building an elevator system in a building under construction including: installing in an elevator shaft a movable machine platform supporting an elevator car and a counterweight; installing above the machine platform a lifting platform; raising the lifting platform by a construction crane or lifting device before raising the machine platform; and equipping the lifting platform with a cable catch device having a safety cable arranged between the lifting platform and a cable pulley support fixed above the lifting platform, the safety cable having a first load-bearing cable portion fixed to or above the lifting platform and a last load-bearing cable portion guided through a cable stop device attached to the lifting platform, the cable stop device blocking the last portion to prevent further lowering of the lifting platform after a speed of the last portion relative to the cable stop device exceeds a specified limit.

15 Claims, 4 Drawing Sheets

(56) References Cited

FOREIGN PATENT DOCUMENTS

| | | | | | |
|---|---|---|---|---|---|
| CN | 115190862 | A | * | 10/2022 | ......... B66B 11/0045 |
| FR | 2694279 | A1 | * | 2/1994 | ............. B66B 19/00 |
| WO | 2010100319 | A1 | | 9/2010 | |
| WO | 2015003964 | A1 | | 1/2015 | |
| WO | WO-2015003965 | A1 | * | 1/2015 | ............. B66B 19/00 |
| WO | 2017102684 | A1 | | 6/2017 | |
| WO | WO-2017102684 | A1 | * | 6/2017 | ............. B66B 19/00 |
| WO | WO-2019068469 | A1 | * | 4/2019 | ............. B66B 19/00 |
| WO | WO-2020088979 | A1 | * | 5/2020 | ............... B66B 1/36 |
| WO | WO-2020193119 | A1 | * | 10/2020 | ............. B66B 19/00 |
| WO | WO-2022069316 | A1 | * | 4/2022 | |
| WO | WO-2022135689 | A1 | * | 6/2022 | ......... B66B 11/0045 |

* cited by examiner

METHOD FOR BUILDING AN ELEVATOR SYSTEM, AND ELEVATOR SYSTEM SUITABLE FOR CARRYING OUT THE METHOD

FIELD

The invention relates on the one hand to a method for building an elevator system in a building which is in its construction phase, in which method a usable lifting height of the elevator system is adapted to an increasing height of the building, and on the other hand to an elevator system suitable for carrying out the method. Such an elevator system usually comprises a machine platform with an elevator drive machine that can be moved along an elevator shaft and temporarily locked therein, as well as at least one elevator car that is suspended from the machine platform by suspension means and is driven by the elevator drive machine. In the course of the installation of the elevator system, the usable lifting height of the elevator car is adapted from time to time to an increasing height of the building, in that at least the machine platform supporting the elevator car is raised to a higher level using a lifting platform temporarily fixed above the machine platform.

BACKGROUND

WO2010/100319 discloses such an elevator system and such a method, in which an elevator car and a counterweight are suspended via flexible traction means on a machine platform that can be raised and temporarily fixed in the elevator shaft. The traction means are guided over a traction sheave of an elevator drive machine, so that the traction means are driven by the traction sheave and the elevator car and the counterweight can thus be moved up and down in opposite directions to one another in the elevator shaft. From time to time, the machine platform is raised to a higher level corresponding to the increasing building height and fixed there in the elevator shaft. This means that on the one hand the elevator system can transport people and material up to the top region of the building currently in its construction phase, and on the other hand the users of lower floors that have already been completed and, for example, their furniture, can be transported through the elevator system.

In order to be able to raise the machine platform, a lifting platform that can also be raised and temporarily fixed in the elevator shaft is installed above the machine platform. A group of deflection pulleys is attached to both the lifting platform and the machine platform, wherein a multiply reeved lifting cable is arranged between the group of deflection pulleys of the lifting platform and the group of deflection pulleys of the machine platform in such a way that the machine platform may be raised with the aid of two cable pull devices installed on the machine platform.

Before each raising of the machine platform, the lifting platform must be brought to a higher level in the elevator shaft. This is done with the help of a hoist, which is attached to another supporting structure that can be moved and fixed in the elevator shaft and can raise the lifting platform via a lifting cable.

When the machine platform is raised, the risk of the machine platform falling is usually reduced by equipping it with safety brakes that act on guide rails of the elevator car, on which the machine platform is also guided. If, in any situation, a maximum permissible descent speed is exceeded, the safety brakes are activated and the machine platform is stopped by braking action between the guide rails and the safety brakes.

There is also a risk of the lifting platform falling into the elevator shaft when raising the lifting platform. However, the lifting platform cannot be guided on guide rails, since no guide rails are installed at the time the lifting platform is raised in the uppermost region of the elevator shaft, in which the lifting platform must be positioned before the machine platform is raised. Safety brakes as fall protection are therefore not applicable.

SUMMARY

The present invention is based on the object of creating a method and an elevator system suitable for carrying out the method of the type described above, in which the risk of the lifting platform falling and thus also the risk of accidents for the assembly personnel is minimized when the lifting platform is raised.

The solution to the problem consists, on the one hand, in a method for building an elevator system in an elevator shaft of a building that is in its construction phase, in which method a usable lifting height of the elevator system is adapted to an increasing height of the building, wherein a machine platform, which can be raised and temporarily locked along car guide rails and on which an elevator drive machine having a traction sheave is arranged, is installed in the elevator shaft, wherein an elevator car and a counterweight are suspended from the machine platform via suspension means, wherein the suspension means are guided at least over the traction sheave of the elevator drive machine, so that the elevator car and the counterweight can be moved up and down in opposite directions to one another along guide rails in the elevator shaft by the traction sheave via the suspension means, wherein a lifting platform that can be raised and temporarily locked in the elevator shaft is installed above the machine platform, with which the machine platform is raised—usually with an elevator car coupled thereto—when the usable lifting height of the elevator car is to be adapted to a current height of the elevator shaft, wherein the lifting platform is raised to a higher level by means of a construction crane or another lifting device, before the machine platform is raised, and wherein the lifting platform is equipped with a cable catch device which comprises a safety cable that is arranged between the lifting platform and a cable pulley support fixed above the lifting platform in the elevator shaft according to the principle of a block and tackle having at least two load-bearing cable portions, wherein a first load-bearing cable portion of the safety cable is fixed to the lifting platform or stationarily above the lifting platform and a last load-bearing cable portion is guided through a cable stop device attached to the lifting platform, through which cable stop device the last load-bearing cable portion is blocked and thus further lowering of the lifting platform is prevented after the speed of the last load-bearing cable portion relative to the cable stop device has exceeded a specified limit.

Load-bearing cable portions are portions of the safety cable arranged according to the principle of a block and tackle, which, after activation of the cable catch device or its cable stop device, each transfer equal parts of the total braking force occurring during the catching process between the cable pulley support and the lifting platform. A commercially available device (e.g. «Bloc-Stop», Tractel, Inc. of Norwood, MA) can be used as a cable stop device.

With the method according to the invention or with the elevator system according to the invention, which includes the described cable catch device for the lifting platform, the requirement for minimizing the risk of the lifting platform falling can be met with relatively little effort, even if the lifting platform must be positioned in the uppermost region of the elevator shaft that does not yet have any guide rails.

Advantageous, supplementary or alternative embodiments and developments of the invention are described below.

In an advantageous embodiment of the method according to the invention, the load-bearing cable portions of the safety cable are arranged such that, when the cable catch device is activated, the line of action of the resultant cable forces of all load-bearing cable portions substantially goes through the center of gravity of the lifting platform.

This measure ensures that, when a lifting platform that is moving downwards at an impermissibly high speed is stopped by the cable catch device, a lifting platform that is not guided on guide rails does not tip over, but rather maintains its horizontal position. Injuries to assembly personnel and damage to the lifting platform and the walls of the elevator shaft can thus be avoided.

In a further possible embodiment of the method according to the invention, the entire safety cable of the cable catch device is arranged in such a way that it runs completely outside of a free space that extends in the upward direction above the center of gravity of the lifting platform, which free space allows a crane hook of the construction crane to be lowered to a coupling element on the lifting platform attached above the center of gravity.

Such an arrangement of the safety cable allows an unimpeded vertical lowering of a crane cable to the center of gravity of the lifting platform and its coupling to a coupling element present on the lifting platform in or above its center of gravity.

In a further possible embodiment of the method according to the invention, the free space is dimensioned in such a way that a cylinder having a diameter of at least 0.4 m and extending upwards from the center of gravity of the lifting platform can be arranged in the free space.

This also allows a crane hook cable block with a crane hook arranged thereon to be lowered to the coupling element present on the lifting platform.

In a further possible embodiment of the method according to the invention, the cable pulley support is attached to a protective platform that can be vertically displaced and fixed above the lifting platform in the elevator shaft.

This is a particularly advantageous solution for attaching the cable pulley support in the elevator shaft, since such a protective platform must be present anyway to protect the assembly personnel from falling objects.

In a further possible embodiment of the method according to the invention, the protective platform is provided with a passage opening arranged in the region of the free space explained above, through which passage opening the crane hook is lowered to the coupling element on the lifting platform.

In a further possible embodiment of the method according to the invention, the cable pulley support is equipped with four vertically and four horizontally arranged deflection pulleys. The definition of the installation position of the deflection pulleys—vertically or horizontally—refers to the position of the cable pulley level. In this embodiment variant, the safety cable is guided through these deflection pulleys and through at least one load-bearing pulley of a load-bearing pulley arrangement coupled to the lifting platform in such a way that the safety cable forms four load-bearing cable portions and runs completely outside of the free space. This embodiment has the advantage that all coupling points present between the cable catch device and the lifting platform are close to a reference plane that extends vertically through the center of gravity of the lifting platform, so that more space is available for assembly personnel and auxiliary equipment on both sides of the reference plane.

In a further possible embodiment of the method according to the invention, the cable pulley support is equipped with only four vertically arranged deflection pulleys, wherein the safety cable is guided through these deflection pulleys and through at least one load-bearing pulley of a load-bearing pulley arrangement coupled to the lifting platform in such a way that the safety cable forms four load-bearing cable portions and runs completely outside of the free space.

Lower production costs can be achieved with this embodiment if there is sufficient space available on the side of the above-mentioned reference plane, which extends vertically through the center of gravity of the lifting platform.

In a further possible embodiment of the method according to the invention, the safety cable—with reference to a reference plane extending vertically through the center of gravity of the lifting platform—is guided from a safety cable fixed point on the lifting platform vertically upwards to a vertical first deflection pulley arranged at right angles to the reference plane in the cable pulley support, after the first deflection pulley at right angles to the reference plane and away therefrom to a horizontal second deflection pulley, after the second deflection pulley horizontally and parallel to the vertical reference plane to a horizontal third deflection pulley, after the third deflection pulley at right angles to the reference plane and towards this to a vertical fourth deflection pulley arranged at right angles to the reference plane, after the fourth deflection pulley vertically downwards to a load-bearing pulley arrangement connected to the lifting platform, which arrangement comprises at least one load-bearing pulley, the pulley plane of which is arranged vertically and transversely to the reference plane, after the load-bearing pulley arrangement vertically upwards to a vertical fifth deflection pulley arranged at right angles to the reference plane in the cable pulley support, after the fifth deflection pulley at right angles to the reference plane and away therefrom to a horizontal sixth deflection pulley, after the sixth deflection pulley horizontally and parallel to the vertical reference plane to a horizontal seventh deflection pulley opposite the second deflection pulley mirror-symmetrically to the reference plane, after the seventh deflection pulley at right angles to the reference plane and towards this to a vertical eighth deflection pulley arranged at right angles to the reference plane, and after the eighth deflection pulley vertically downwards to the cable stop device attached to the lifting platform.

In a further possible embodiment of the method according to the invention, the safety cable—with reference to a reference plane extending vertically above the lifting platform through its center of gravity—is guided from a safety cable fixed point on the lifting platform vertically upwards to a vertical first deflection pulley of the cable pulley support arranged parallel to the reference plane, after the first deflection pulley horizontally and parallel to the reference plane to a vertical second deflection pulley arranged parallel to the reference plane, after the second deflection pulley vertically downwards to a load-bearing pulley arrangement connected to the lifting platform having at least one vertical load-bearing pulley which is arranged transversely to the reference plane, after the load-bearing pulley arrangement vertically upwards to a vertical third deflection pulley of the cable pulley support arranged parallel to the reference plane, after the third deflection pulley horizontally and parallel to the vertical reference plane to a vertical fourth deflection pulley arranged parallel to the reference plane, and mirror-symmetrically to the reference plane opposite the first deflection pulley, and after the fourth deflection pulley vertically downwards to the cable stop device attached to the lifting platform.

In a further possible embodiment of the method according to the invention, the lifting platform is equipped with a lifting device, in which a lifting cable is guided within the free space above the lifting platform from a lifting cable holder on the lifting platform upwards to a lifting cable deflection pulley of a lifting cable deflection device which is at least temporarily fixed in the free space and from a lifting cable deflection pulley of the lifting cable deflection device downwards to a cable pull device arranged on the lifting platform.

The term "cable pull device" is to be understood here as meaning any device that is suitable for pulling a cable—in particular a wire cable—and for moving it in the direction of its longitudinal axis against resistance. The cable pull device can be driven manually, preferably electrically.

This embodiment variant has the advantage that the lifting platform and thus also the machine platform can also be raised if the construction crane is not available for a longer period of time.

In a further possible embodiment of the method according to the invention, the lifting cable deflection device comprising at least one lifting cable deflection pulley is arranged in the region of the free space on the protective platform for raising the lifting platform with the aid of the lifting device, and for raising the lifting platform with the help of the construction crane, the lifting cable deflection device is removed from the region of the free space.

On the one hand, this embodiment variant has the advantage that the attachment of the lifting cable deflection device in the elevator shaft can be implemented easily and inexpensively, and on the other hand, the temporary arrangement of the lifting cable deflection device in the mentioned free space, which is provided in this embodiment variant, makes it possible for the resultant amount of all load-bearing cable forces of the lifting cable of the lifting device to pass through the center of gravity of the lifting platform.

A further aspect of the invention relates to an elevator system in an elevator shaft of a building that is in its construction phase, in which elevator system a usable lifting height of the elevator system can be adapted to an increasing height of the building. This elevator system is preferably designed in such a way that it is suitable for carrying out the method described above.

The elevator system comprises a machine platform installed in the elevator shaft, which can be raised and temporarily locked along car guide rails, wherein an elevator drive machine having a traction sheave is arranged on the machine platform. The elevator system also comprises an elevator car and a counterweight, which are suspended from the machine platform via suspension means, wherein the suspension means are guided at least over the traction sheave of the elevator drive machine, so that the elevator car and the counterweight can be moved up and down in opposite directions to one another along guide rails in the elevator shaft by the traction sheave via the suspension means. The elevator system also comprises a lifting platform installed above the machine platform in the elevator shaft, which can be raised and temporarily locked, wherein the lifting platform is used to raise the machine platform with the elevator car or the counterweight when the usable lifting height of the elevator car is to be adapted to a current height of the elevator shaft. The lifting platform is designed in such a way that it can be raised to a higher level by means of a construction crane or another lifting device before the machine platform is raised. The lifting platform is equipped with a cable catch device, which comprises a safety cable that is arranged or can be arranged between the lifting platform and a cable pulley support fixed above the lifting platform in the elevator shaft according to the principle of a block and tackle having at least two load-bearing cable portions, wherein a first load-bearing cable portion of the safety cable is fixed or can be fixed to the lifting platform or stationarily above the lifting platform and a last load-bearing cable portion is guided or can be guided through a cable stop device attached to the lifting platform, through which the last load-bearing cable portion can be blocked and thus further lowering of the lifting platform can be prevented after the speed of the last load-bearing cable portion relative to the cable stop device has exceeded a specified limit.

The elevator system can comprise a protective platform that can be vertically displaced and fixed above the lifting platform in the elevator shaft and to which the cable pulley support is attached. The protective platform can be provided with a passage opening through which a crane hook can be lowered to a coupling element on the lifting platform.

The cable pulley support can be equipped with four vertically and four horizontally arranged deflection pulleys, wherein the safety cable is guided through these deflection pulleys and through at least one load-bearing pulley of a load-bearing pulley arrangement coupled to the lifting platform in such a way that the safety cable forms four load-bearing cable portions and runs completely outside of a free space which makes possible the lowering of the crane hook of a construction crane to the coupling element.

Alternatively, the cable pulley support can be equipped with only four vertically arranged deflection pulleys, wherein the safety cable is guided through these deflection pulleys and through at least one load-bearing pulley of a load-bearing pulley arrangement coupled to the lifting platform in such a way that the safety cable forms four load-bearing cable portions and runs completely outside of the free space mentioned.

The lifting platform can be equipped with a lifting device comprising a lifting cable, lifting cable holder, lifting cable deflection pulley and cable pull device, wherein the lifting cable is guided within said free space above the lifting platform from the lifting cable holder on the lifting platform upwards to a lifting cable deflection pulley of the lifting cable deflection device temporarily fixed in the free space downwards to the cable pull device arranged on the lifting platform.

DESCRIPTION OF THE DRAWINGS

Embodiments of the invention shall be described in further detail in the description below with reference to the accompanying drawings. In the drawings.

DETAILED DESCRIPTION

Figure 1:
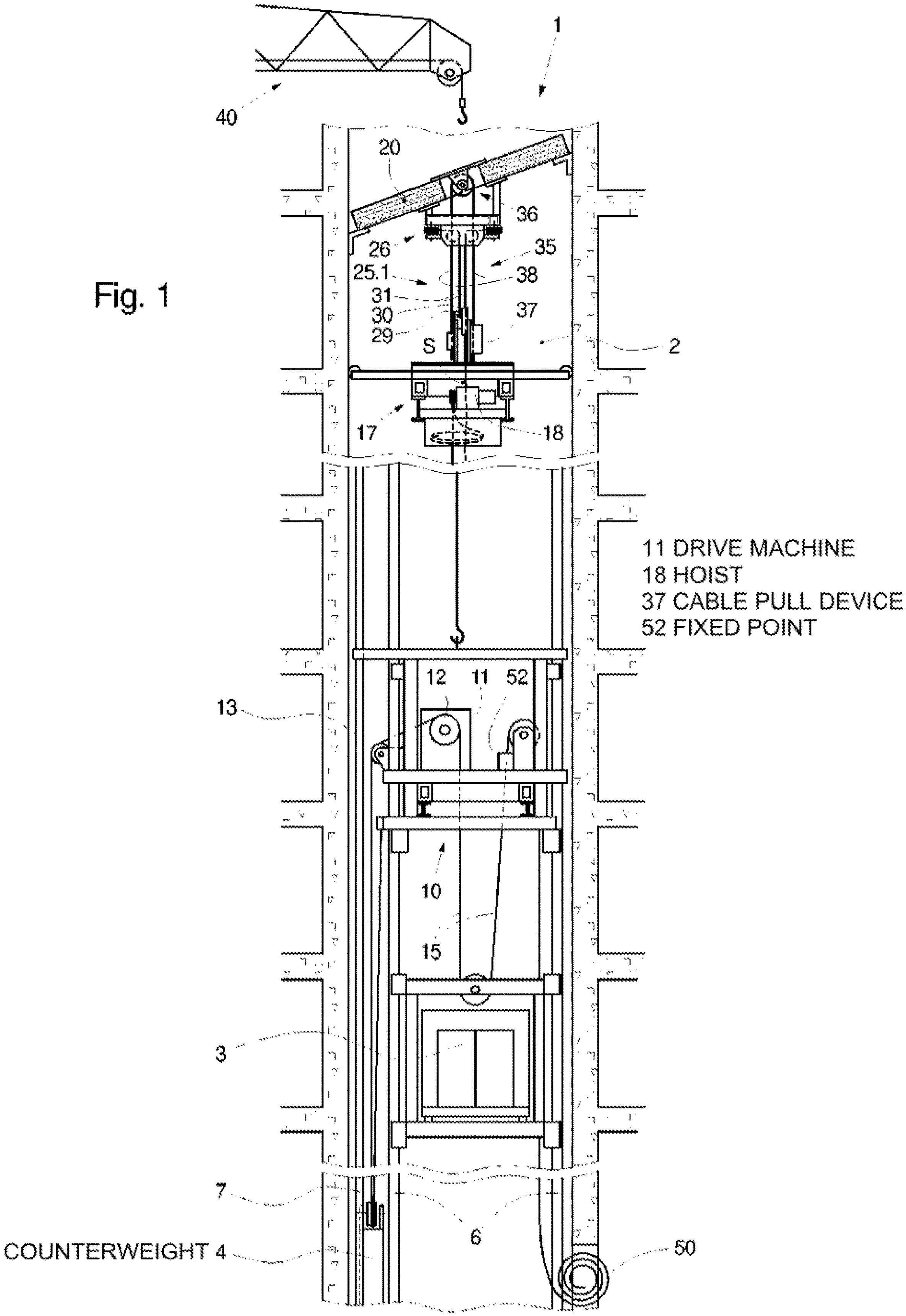
FIG. 1 shows a cross section through an elevator shaft with an elevator system, the usable lifting height of which can be adapted to an increasing height of the building, wherein the elevator system comprises a machine platform, an elevator car which is suspended from the machine platform and a counterweight, and a lifting platform which is used to raise the machine platform, wherein the lifting platform is equipped with a cable catch device and a lifting device, which interact with a protective platform. Furthermore, a construction crane is indicated, which is used as an alternative to the lifting device for raising the lifting platform.

FIG. 1 shows an elevator system 1 according to the invention and suitable for carrying out the method according to the invention, which elevator system is installed in an elevator shaft 2 of a building which is in its construction phase. The elevator system 1 is designed in such a way that the usable lifting height of an elevator car 3 of the elevator system 1 can be adapted from time to time to an increasing height of the building or the elevator shaft 2.

The elevator system 1 comprises, firstly, the elevator car 3 and a counterweight 4 which can be displaced vertically along car guide rails 6 or counterweight guide rails 7 in the elevator shaft 2. Secondly, the elevator system 1 comprises a machine platform 10 on which an elevator drive machine 11 having a traction sheave 12 and a deflection pulley 13 are installed, wherein the elevator car 3 and the counterweight 4 are suspended from the machine platform in such a way that support means 15 are guided at least over the traction sheave 12, so that the elevator car 3 and the counterweight 4 can be moved up and down in opposite directions to one another by the traction sheave 12 along car guide rails 6 or counterweight guide rails 7 in the elevator shaft 2 via the suspension means 15. The machine platform 10 is guided on the car guide rails 6 in the elevator shaft 2, can be raised along these car guide rails 6 in the elevator shaft 2, and can be temporarily locked therein via horizontally extendable supports. Thirdly, the elevator system 1 comprises a lifting platform 17 which is arranged above the machine platform 10 and which can be vertically displaced and locked in the elevator shaft 2. The lifting platform 17 is used for raising the machine platform 10, which usually weighs several thousand kilograms. It is appropriately dimensioned and equipped with a sufficiently powerful hoist 18.

Of course, before each raising of the machine platform 10, the lifting platform 17 itself must be raised to a higher level and fixed there, wherein the raising takes place with the aid of a construction crane 40 or another lifting device 35 explained in more detail in connection with FIG. 3. Unlike the machine platform 10, however, the lifting platform 17 is not guided on guide rails, since the lifting platform has to be temporarily locked in regions of the elevator shaft 2 in which no guide rails are installed. The car guide rails 6 as well as the counterweight guide rails 7 are extended upwards before each raising of the machine platform 10 to the next higher locking position of the machine platform, which is preferably accomplished from an assembly platform (not shown here) that can be installed between the machine platform 10 and the lifting platform 17.

Fourth, the elevator system 1 comprises a protective platform 20 that can be fixed in the elevator shaft 2 or on the elevator shaft, which platform is absolutely necessary to protect the assembly personnel and the elevator system from falling objects. In the elevator system 1 according to the invention, the protective platform 20 also serves as a support for a cable pulley support 26 of a cable catch device 25.1, which serves as fall protection for the lifting platform 17. A safety cable fixed point 29, a cable stop device 30 and a safety cable 31 comprising four load-bearing cable portions can also be seen as components of the cable catch device in FIG. 1. Details and functioning of the cable catch device 25.1 are described in more detail below in connection with FIG. 2.

The protective platform 20 can also form a support for a lifting cable deflection device 36 of a lifting device 35 which is used for raising the lifting platform 17. The lifting device 35 comprises a cable pull device 37 installed on the lifting platform 17, which interacts with a lifting cable 38 and the lifting cable deflection device 36 in such a way that the lifting platform 17 can be raised with the lifting device without using a construction crane.

A construction crane 40 is indicated above the protective platform 20 or above the currently upper end of the elevator shaft 2, with the help of which construction crane the lifting platform 17 can be raised with less effort than with the lifting device 35, if the construction crane is available when the lifting platform is to be raised.

In the lowest part of the elevator shaft 2 in a niche of the shaft wall of the elevator shaft 2 there is a suspension means storage 50. This serves to keep ready the additional suspension means length required when the usable lifting height of the elevator car 3 is increased and to deliver it if necessary.

An adaptation of the elevator system 1 to a newly available greater height of the elevator shaft 2 is essentially achieved in that—if necessary—first the protective platform 20 is raised to a higher level. This is usually carried out using a construction crane 40 or a hoist suspended from, for example, a temporarily installed cross member. The lifting platform 17 is then raised with the construction crane or the lifting device 35 and fixed at a height in the elevator shaft 2 which makes it possible to transport the machine platform 10 to the planned new level with the hoist 18 of the lifting platform and to lock the machine platform there. Before the machine platform 10 is raised, the counterweight 4 is positioned on its lower buffers, the elevator car 3 is coupled to the machine platform 10, and the attachment of the suspension means of the elevator car and the counterweight to the suspension means fixed point 52 on the machine platform 10 is released. When the machine platform and the elevator car 3 are raised, the amount of suspension means required for the lengthening of the suspension means 15 is automatically withdrawn from the suspension means storage 50. After the end of the lifting process, the suspension elements 15 are fixed again at the suspension means fixed point 52, and after some adjustment work has been carried out, the elevator system 1 is again ready for operation with a usable lifting height of the elevator car 3 adapted to the current building height.

Figure 2:
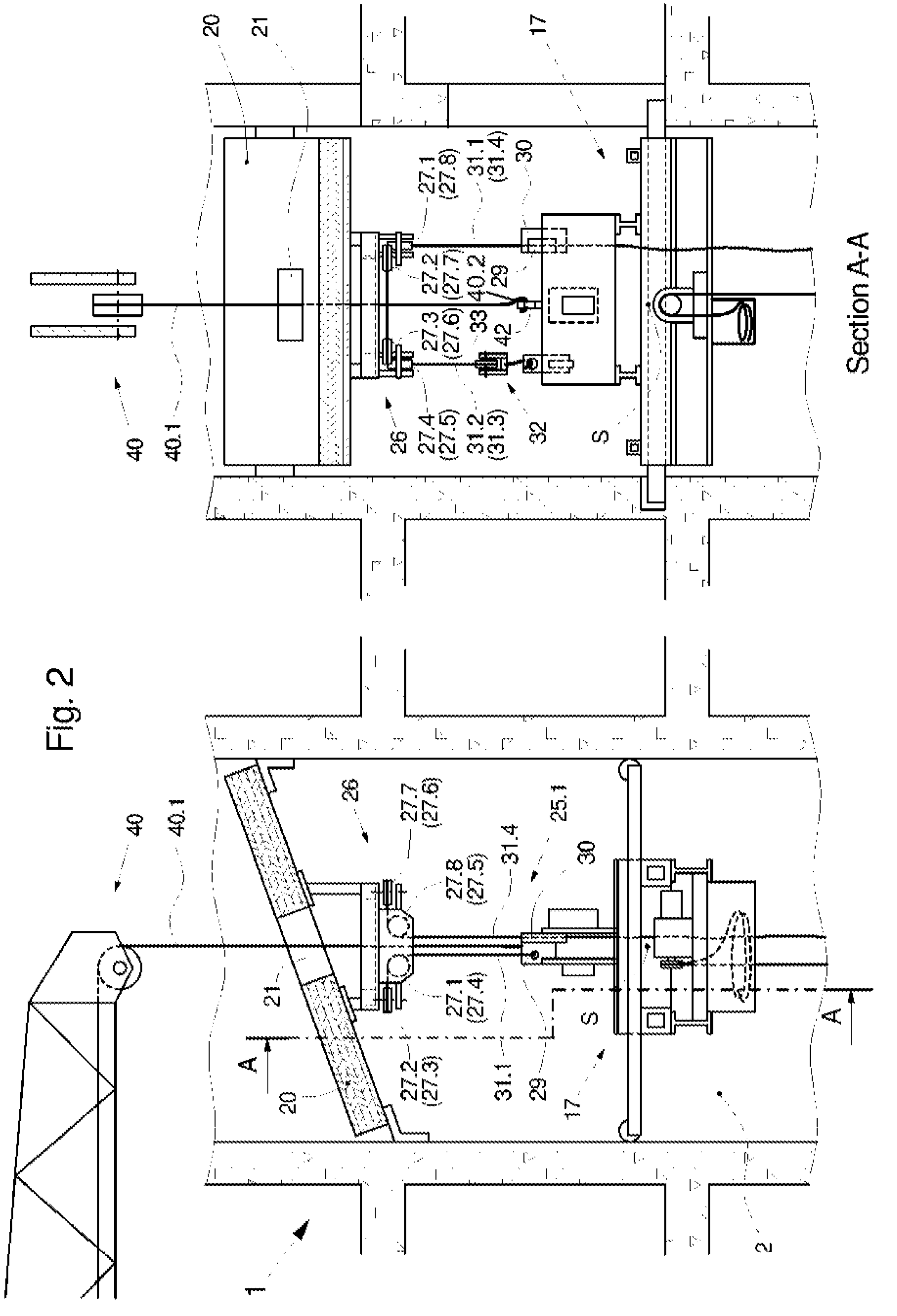
FIG. 2 is a side view of a part of the elevator system according to FIG. 1 with a section through this part, wherein the lifting platform used for raising the machine platform is shown, which is equipped with the first variant of the cable catch device that interacts with the protective platform and can only be raised by the construction crane.

FIG. 2 shows a side view of part of the elevator system according to FIG. 1 in the uppermost region of the elevator shaft 2 on the left-hand side, and a section A-A through this region on the right-hand side. The vertically displaceable lifting platform 17 that is used for raising the machine platform 10 (FIG. 1) is shown in a situation in which it is being raised by a construction crane 40. In a first embodiment, the lifting platform is equipped with a cable catch device 25.1 that serves as fall protection for the lifting platform. The cable catch device 25.1 comprises the cable pulley support 26, in which a group of four vertically and four horizontally arranged cable pulleys 27.1-27.8 is arranged. The definition of the installation position—vertically or horizontally—refers to the position of the cable pulley level. The cable pulley support 26 with the cable pulleys is fixed to the protective platform 20, which has been positioned in or on the currently uppermost region of the elevator shaft at the latest when the usable lifting height of the elevator system 1 begins to be adapted to a currently existing height of the building or elevator shaft 2. Furthermore, the cable catch device 25.1 comprises the safety cable fixed point 29 attached to the lifting platform 17, a load-bearing pulley arrangement 32 coupled to the lifting platform, the cable stop device 30 and the four load-bearing cable portions 31.1-31.4 comprising the safety cable 31.

In the embodiment of the cable catch device 25.1 shown in FIG. 2, the safety cable is arranged between the lifting platform 17 and the cable pulley support 26 fixed above the lifting platform in the elevator shaft according to the principle of a block and tackle having the four load-bearing cable portions 31.1-31.4, wherein a first load-bearing cable portion 31.1 of the safety cable 31 is fixed to the safety cable fixed point 29 attached to the lifting platform 17, and wherein a last load-bearing cable portion 31.4 is guided through a cable stop device 30 attached to the lifting platform.

In the event of a fall of the lifting platform 17, in which the last load-bearing cable portion 31.4 moves at four times the speed of the lifting platform in relation to the cable stop device 30 as a result of the block and tackle effect, the last load-bearing cable portion 31.4 is blocked by the cable stop device 30 after the speed of the last load-bearing cable portion 31.4 relative to the cable stop device has exceeded a specified limit. This prevents the lifting platform from lowering further before the speed of the lifting platform becomes too high. The arrangement of the load-bearing cable portions 31.1-31.4 of the cable catch device 25.1 shown in FIG. 2 allows the line of action of the resultant cable forces of all load-bearing cable portions of the cable catch device to substantially pass through the center of gravity S of the lifting platform 17 even when the cable catch device is activated, even if the safety cable 31—as explained below—has to be arranged completely outside of a cylindrical free space that extends vertically upwards above the center of gravity S, so that a crane cable of a construction crane 40 can be coupled to the lifting platform 17 in the center of gravity S or above the center of gravity. This is important for stable raising of the lifting platform, especially because the lifting platform is not guided on guide rails when raising.

The arrangement of the safety cable 31 of the cable catch device 25.1 according to FIG. 2 makes it possible for the entire safety cable to run outside of a free space extending above the center of gravity S of the lifting platform 17 in the upward direction. For raising the lifting platform 17 with the aid of the construction crane 40, a crane hook of the construction crane can be lowered through this free space to a coupling element 42 attached to the lifting platform above the center of gravity. For this purpose, on the one hand, the safety cable 31 is arranged in such a way that a free space is realized in which a cylinder having a diameter of at least 0.4 m and extending upwards from the center of gravity S of the lifting platform 17 could be arranged. On the other hand, the protective platform, to which the cable pulley support 26 is fixed, is provided with a closable passage opening 21 for the stated purpose.

The cable catch device 25.1 for the lifting platform 17 shown in FIG. 2 solves the problem of ensuring that, on the one hand, the catching force resulting from a catching process passes through the center of gravity S of the lifting platform and, on the other hand, that a free space extending upwards from the center of gravity S space can be realized. In detail, this object is achieved by the safety cable 31—with reference to an imaginary reference plane extending vertically through the center of gravity S of the lifting platform 17—is guided from a safety cable fixed point 29 on the lifting platform vertically upwards to a vertical first deflection pulley 27.1 arranged at right angles to said reference plane in the cable pulley support 26, after the first deflection pulley at right angles to the reference plane and away therefrom to a horizontal second deflection pulley 27.2, after the second deflection pulley horizontally and parallel to the vertical reference plane to a horizontal third deflection pulley 27.3, after the third deflection pulley at right angles to the reference plane and towards this to a vertical fourth deflection pulley 27.4 arranged at right angles to the reference plane, after the fourth deflection pulley vertically downwards to a load-bearing pulley arrangement 32 connected to the lifting platform, which arrangement comprises at least one load-bearing pulley 33, the pulley plane of which is arranged vertically and transversely to the reference plane, after the load-bearing pulley arrangement 32 vertically upwards to a vertical fifth deflection pulley 27.5 arranged at right angles to the reference plane in the cable pulley support, after the fifth deflection pulley at right angles to the reference plane and away therefrom to a horizontal sixth deflection pulley 27.6, after the sixth deflection pulley horizontally and parallel to the vertical reference plane to a horizontal seventh deflection pulley 27.7 opposite the second deflection pulley 27.2 mirror-symmetrically to the reference plane, after the seventh deflection pulley at right angles to the reference plane and towards this to a vertical eighth deflection pulley 27.8 arranged at right angles to the reference plane, and after the eighth deflection pulley vertically downwards to the cable stop device 30 attached to the lifting platform.

In FIG. 2, the lifting platform 17 is shown without the lifting device 35 shown in FIG. 1, either because the lifting device has been dismantled to enable a crane cable to be coupled to the lifting platform for raising the lifting platform 17, or because there is no lifting device at all, since it is intended to raise the lifting platform exclusively with the construction crane 40.

Figure 3:
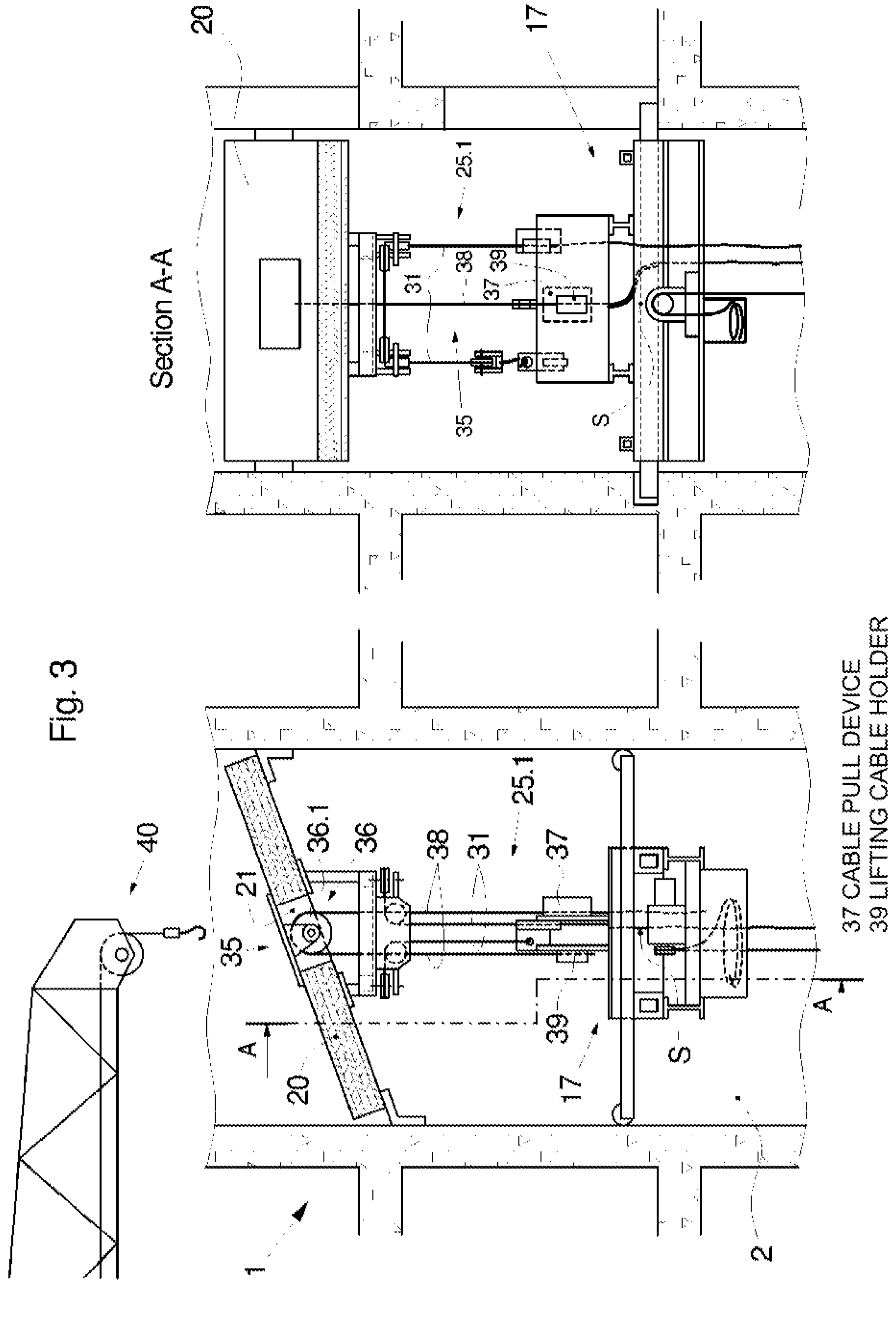
FIG. 3 is a side view of a part of the elevator system according to FIG. 1 with a section through this part, wherein the lifting platform used for raising the machine platform is shown, which is equipped with the first variant of the cable catch device and with a lifting device that also interacts with the protective platform and alternatively can be raised by the lifting device or by the construction crane.

Like FIG. 2, FIG. 3 shows a side view of a part of the elevator system 1 according to FIG. 1 in the currently topmost region of the elevator shaft 2 on the left-hand side, and a section A-A through this region on the right-hand side. The lifting platform 17 is equipped with the cable catch device 25.1 according to the first embodiment shown in FIG. 2. In contrast to FIG. 2, however, FIG. 3 shows the elevator system with the lifting device 35 indicated in FIG. 1, which is used to raise the lifting platform 17, because no construction crane is present, or if the construction crane is not available within a reasonable time at the time of the adaptation of the usable lifting height of elevator system.

In comparison with the elevator system shown in FIG. 2, the elevator system 1 according to FIG. 3, which is equipped with the lifting device 35, additionally has a lifting cable deflection device 36, a cable pull device 37, a lifting cable 38 and a lifting cable holder 39. The lifting cable deflection device, which comprises at least one lifting cable deflection pulley 36.1, is advantageously fixed to the protective platform 20 described in connection with FIG. 1 in the region of the passage opening 21 present therein. A first load-bearing portion of the lifting cable 38 is fixed to the lifting platform 17 by means of the lifting cable holder 39. From this lifting cable holder, the lifting cable is guided vertically upwards to the at least one lifting cable deflection pulley 36.1 of the lifting cable deflection device 36, wraps around it by 180 degrees and then runs as the second load-bearing portion of the lifting cable 38 downwards to the cable pull device 37 attached to the lifting platform 17 through which this is passed. The two load-bearing portions of the lifting cable 38 run within the free space described in connection with FIG. 2, bypassed by the portions of the safety cable 31, and extending upwards from the center of gravity S of the lifting platform. In the case of the lifting device 35 explained here, too, the resultant cable forces of the load-bearing portions of the lifting cable 38 pass through the center of gravity S of the lifting platform 17. For raising the lifting platform 17 with the help of the construction crane 40, the lifting cable 38 and the lifting cable deflection device 36 must be removed from the free space. The cable pull device 37 is advantageously electrically driven and comprises, for example, driven friction pulleys which are pressed against the lifting cable and with which the lifting cable 38 is pulled through the cable pull device. The lifting platform 17 is raised by the interaction of the cable pull device 37, the lifting cable 38, the lifting cable deflection device 36, and the lifting cable holder 39.

Figure 4:
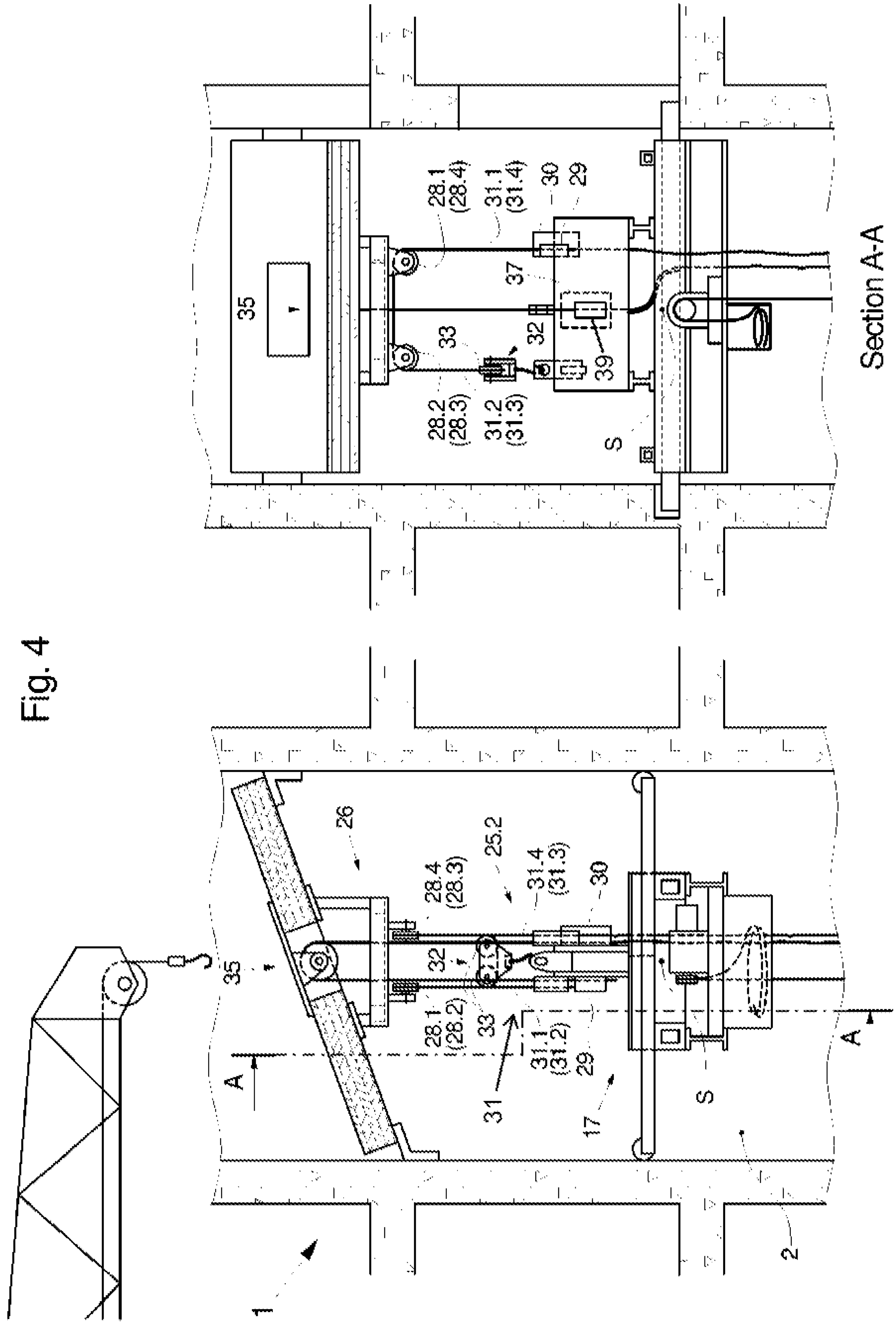
FIG. 4 is a side view of a part of the elevator system according to FIG. 1 with a section through this part, wherein the lifting platform used for raising the machine platform is shown, which is equipped with a second variant of the cable catch device and with a lifting device that also interacts with the protective platform and alternatively can be raised by the lifting device or by the construction crane.

Like FIG. 2 and FIG. 3, FIG. 4 shows a side view of a part of the elevator system 1 according to FIG. 1 in the currently topmost region of the elevator shaft 2 on the left-hand side, and a section A-A through this region on the right-hand side. The lifting platform 17 is equipped with a lifting device 35—as already described in connection with FIG. 3. In contrast to the elevator system shown in FIG. 3, however, the elevator system according to FIG. 4 is equipped with a cable catch device 25.2 according to a second embodiment. In this embodiment, the cable pulley support 26 of the cable catch device 25.2 is equipped with only four vertically arranged deflection pulleys 28.1-28.4, wherein the safety cable 31 is guided by these deflection pulleys and at least one load-bearing pulley 33 of a load-bearing pulley arrangement 32 coupled to the lifting platform 17 in such a way that the safety cable forms four load-bearing cable portions 31.1-31.4 and runs over its entire length outside the free space required for lowering a crane hook.

The cable catch device 25.2 for the lifting platform 17 shown in FIG. 4 also solves the problem of ensuring that, on the one hand, during a catching process, the resultant catching forces occurring in all load-bearing cable portions 31.1-31.4 pass through the center of gravity S of the lifting platform 17, and that on the other hand a sufficiently large free space extending upwards from the center of gravity S can be realized. In detail, this object is achieved by the safety cable 31—with reference to an imaginary reference plane extending vertically above the lifting platform through its center of gravity S—is guided from a safety cable fixed point 29 on the lifting platform 17 vertically upwards to a vertical first deflection pulley 28.1 of the cable pulley support 26 arranged parallel to the reference plane, after the first deflection pulley horizontally and parallel to the reference plane to a vertical second deflection pulley 28.2 arranged parallel to the reference plane, after the second deflection pulley vertically downwards to a load-bearing pulley arrangement 32 connected to the lifting platform 17 having at least one vertical load-bearing pulley 33 which is arranged transversely to the reference plane, after the load-bearing pulley arrangement 32 vertically upwards to a vertical third deflection pulley 28.3 of the cable pulley support arranged parallel to the reference plane, after the third deflection pulley horizontally and parallel to the vertical reference plane to a vertical fourth deflection pulley 28.4 arranged parallel to the reference plane and mirror-symmetrically to the reference plane opposite the first deflection pulley 28.1, and after the fourth deflection pulley vertically downwards to the cable stop device 30 attached to the lifting platform.

In order to achieve a sufficient cross section of the free space mentioned, this embodiment results in slightly larger dimensions—measured transversely to the imaginary reference plane mentioned—of the part of the lifting platform 17 on which the safety cable fixed point 29 and the cable stop device 30 of the cable catch device 25.2 and the lifting cable holder 39 and the cable pull device 37 of the lifting device 35 are attached. With this simpler embodiment, however, lower production costs can be achieved if there is sufficient space available on the side of the above-mentioned reference plane, which extends vertically through the center of gravity S of the lifting platform.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for building an elevator system in an elevator shaft of a building that is in a construction phase, wherein the method includes adapting a usable lifting height of the elevator system to an increasing height of the building, the method comprising the steps of:

installing in the elevator shaft a machine platform that is adapted to be raised and temporarily locked along car guide rails and on which an elevator drive machine having a traction sheave is arranged;

suspending an elevator car and a counterweight from the machine platform via suspension means, wherein the suspension means are guided at least over the traction sheave of the elevator drive machine, wherein the elevator car and the counterweight are moved up and down in opposite directions to one another along the car guide rails and counterweight guide rails in the elevator shaft by the traction sheave via the suspension means;

installing a lifting platform above the machine platform, the lifting platform adapted to be raised and temporarily locked in the elevator shaft, and using the lifting platform to raise the machine platform with the elevator car or the counterweight when a usable lifting height of the elevator car is to be adapted to a current height of the elevator shaft;

before raising the machine platform, raising the lifting platform by a construction crane or another lifting device;

wherein the lifting platform is equipped with a cable catch device having a safety cable that is arranged between the lifting platform and a cable pulley support fixed above the lifting platform in the elevator shaft, the safety cable having at least two load-bearing cable portions, wherein a first of the load-bearing cable portions is fixed to the lifting platform or stationarily above the lifting platform and a last of the load-bearing cable portions is guided through a cable stop device to the lifting platform; and wherein the last load-bearing cable portion is blocked by the cable stop device to prevent further lowering of the lifting platform when the lifting platform is moving downwardly and after a speed of movement of the last load-bearing cable portion relative to the cable stop device has exceeded a specified limit thereby activating the cable stop device.

2. The method according to claim 1 including arranging the load-bearing cable portions of the cable catch device such that, when the cable catch device is activated, a line of action of resultant cable forces of all of the load-bearing cable portions passes through a center of gravity of the lifting platform.

3. The method according to claim 2 including arranging safety cable such that it runs completely outside of a free space that extends in an upward direction above the center of gravity of the lifting platform, the free space allowing a crane hook of the construction crane to be lowered to a coupling element attached on the lifting platform above the center of gravity.

4. The method according to claim 3 wherein the free space extends upwards from the center of gravity of the lifting platform with a diameter of at least 0.4 m.

5. The method according to claim 1 including fastening the cable pulley support to a protective platform that is vertically displaceable and attached in the elevator shaft above the lifting platform.

6. The method according to claim 5 wherein the protective platform has a passage opening arranged in a region of the free space, through which passage opening a crane hook is lowered to a coupling element on the lifting platform.

7. The method according to claim 1 wherein the cable pulley support has four vertically and four horizontally arranged deflection pulleys, wherein the safety cable is guided through at least one load-bearing pulley of a load-bearing pulley arrangement coupled to the lifting platform such that the safety cable forms four of the load-bearing cable portions and runs completely outside of a free space above a center of gravity of the lifting platform.

8. The method according to claim 1 wherein the cable pulley support has four vertically arranged deflection pulleys, wherein the safety cable is guided by the deflection pulleys and at least one load-bearing pulley of a load-bearing pulley arrangement coupled to the lifting platform such that the safety cable forms four load-bearing cable portions and runs completely outside of a free space above a center of gravity of the lifting platform.

9. The method according to claim 8 wherein the safety cable, with reference to a reference plane extending vertically through a center of gravity of the lifting platform, is guided from a safety cable fixed point on the lifting platform vertically upwards to a vertical first deflection pulley arranged at right angles to the reference plane in the cable pulley support, after the first deflection pulley at right angles to the reference plane and away therefrom to a horizontal second deflection pulley, after the second deflection pulley horizontally and parallel to the vertical reference plane to a horizontal third deflection pulley, after the third deflection pulley at right angles to the reference plane and towards a vertical fourth deflection pulley arranged at right angles to the reference plane, after the fourth deflection pulley vertically downwards to a load-bearing pulley arrangement connected to the lifting platform, the load-bearing pulley arrangement including at least one load-bearing pulley having a pulley plane arranged vertically and transversely to the reference plane, after the load-bearing pulley arrangement vertically upwards to a vertical fifth deflection pulley mirror-symmetrically to the reference plane opposite the fourth deflection pulley, arranged at right angles to the reference plane in the cable pulley support, after the fifth deflection pulley at right angles to the reference plane and away therefrom to a horizontal sixth deflection pulley, after the sixth deflection pulley horizontally and parallel to the vertical reference plane to a horizontal seventh deflection pulley opposite the second deflection pulley mirror-symmetrically to the reference plane, after the seventh deflection pulley at right angles to the reference plane and towards a vertical eighth deflection pulley arranged at right angles to the reference plane, and after the eighth deflection pulley vertically downwards to the cable stop device attached to the lifting platform.

10. The method according to claim 8 wherein the safety cable, with reference to a reference plane extending vertically through a center of gravity of the lifting platform, is guided from a safety cable fixed point on the lifting platform vertically upwards to a vertical first deflection pulley of the cable pulley support arranged parallel to the reference plane, after the first deflection pulley horizontally and parallel to the reference plane to a vertical second deflection pulley arranged parallel to the reference plane, after the second deflection pulley vertically downwards to a load-bearing pulley arrangement connected to the lifting platform and having at least one vertical load-bearing pulley arranged transversely to the reference plane, after the load-bearing pulley arrangement vertically upwards to a vertical third deflection pulley of the cable pulley support mirror-symmetrically opposite the reference plane relative to the second deflection pulley and arranged parallel to the reference plane, after the third deflection pulley horizontally and parallel to the vertical reference plane to a vertical fourth deflection pulley arranged parallel to the reference plane and mirror-symmetrically to the reference plane opposite the first deflection pulley, and after the fourth deflection pulley vertically downwards to the cable stop device attached to the lifting platform.

11. The method according to claim 1 wherein the lifting platform is equipped with a lifting device having a lifting cable that is guided within a free space above the lifting platform from a lifting cable holder on the lifting platform upwards to a lifting cable deflection pulley of a lifting cable deflection device that is temporarily fixed in the free space and from a lifting cable deflection pulley downwards to a cable pull device arranged on the lifting platform.

12. The method according to claim 11 wherein the lifting cable deflection device includes at least one lifting cable deflection pulley arranged in a region of the free space on the protective platform for raising the lifting platform aided by the lifting device, and including removing the lifting cable deflection device from the region of the free space for raising the lifting platform aided by the construction crane.

13. An elevator system in an elevator shaft of a building that is in a construction phase, wherein a usable lifting height of the elevator system can be adapted to an increasing height of the building, the elevator system being adapted to carry out the method according to claim 1, the elevator system comprising:

a machine platform installed in the elevator shaft and adapted to be raised and temporarily locked along car guide rails, wherein an elevator drive machine having a traction sheave is arranged on the machine platform;

an elevator car and a counterweight suspended from the machine platform via suspension means, wherein the suspension means are guided at least over the traction sheave of the elevator drive machine such that the elevator car and the counterweight are movable up and down in opposite directions to one another along the car guide rails and counterweight guide rails in the elevator shaft by the traction sheave via the suspension means;

a lifting platform installed above the machine platform in the elevator shaft and adapted to be raised and temporarily locked, wherein the lifting platform can raise the machine platform with the elevator car or the counterweight when a usable lifting height of the elevator car is to be adapted to a current height of the elevator shaft; and wherein the lifting platform is adapted to be raised to a higher level by a construction crane or another lifting device before the machine platform is raised; and the lifting platform being equipped with a cable catch device including a safety cable that is arranged between the lifting platform and a cable pulley support fixed above the lifting platform in the elevator shaft, the safety cable having at least two load-bearing cable portions including a first load-bearing cable portion fixed to the lifting platform or stationarily above the lifting platform and a last load-bearing cable portion guided through a cable stop device attached to the lifting platform, wherein the cable stop device blocks the last load-bearing cable portion preventing further lowering of the lifting platform after a speed of the last load-bearing cable portion relative to the cable stop device has exceeded a specified limit.

14. A method for building an elevator system in an elevator shaft of a building that is in a construction phase, wherein the method includes adapting a usable lifting height of the elevator system to an increasing height of the building, the method comprising the steps of:

installing in the elevator shaft a machine platform that is adapted to be raised and temporarily locked along car guide rails and on which an elevator drive machine having a traction sheave is arranged;

suspending an elevator car and a counterweight from the machine platform via suspension means, wherein the suspension means are guided at least over the traction sheave of the elevator drive machine, wherein the elevator car and the counterweight are moved up and down in opposite directions to one another along the car guide rails and counterweight guide rails in the elevator shaft by the traction sheave via the suspension means;

installing a lifting platform above the machine platform, the lifting platform adapted to be raised and temporarily locked in the elevator shaft, and using the lifting platform to raise the machine platform with the elevator car or the counterweight when a usable lifting height of the elevator car is to be adapted to a current height of the elevator shaft;

before raising the machine platform, raising the lifting platform by a construction crane or another lifting device;

wherein the lifting platform is equipped with a cable catch device having a safety cable that is arranged between the lifting platform and a cable pulley support fixed above the lifting platform in the elevator shaft, the safety cable having at least two load-bearing cable portions, wherein a first of the load-bearing cable portions is fixed to the lifting platform or stationarily above the lifting platform and a last of the load-bearing cable portions is guided through a cable stop device to the lifting platform;

wherein the last load-bearing cable portion is blocked by the cable stop device to prevent further lowering of the lifting platform when a speed of movement of the last load-bearing cable portion relative to the cable stop device has exceeded a specified limit;

fastening the cable pulley support to a protective platform that is vertically displaceable and attached in the elevator shaft above the lifting platform; and wherein the protective platform has a passage opening arranged in a region of the free space, through which passage opening a crane hook is lowered to a coupling element on the lifting platform.

15. A method for building an elevator system in an elevator shaft of a building that is in a construction phase, wherein the method includes adapting a usable lifting height of the elevator system to an increasing height of the building, the method comprising the steps of:

installing in the elevator shaft a machine platform that is adapted to be raised and temporarily locked along car guide rails and on which an elevator drive machine having a traction sheave is arranged;

suspending an elevator car and a counterweight from the machine platform via suspension means, wherein the suspension means are guided at least over the traction sheave of the elevator drive machine, wherein the elevator car and the counterweight are moved up and down in opposite directions to one another along the car guide rails and counterweight guide rails in the elevator shaft by the traction sheave via the suspension means;

installing a lifting platform above the machine platform, the lifting platform adapted to be raised and temporarily locked in the elevator shaft, and using the lifting platform to raise the machine platform with the elevator car or the counterweight when a usable lifting height of the elevator car is to be adapted to a current height of the elevator shaft;

before raising the machine platform, raising the lifting platform by a construction crane or another lifting device;

wherein the lifting platform is equipped with a cable catch device having a safety cable that is arranged between the lifting platform and a cable pulley support fixed above the lifting platform in the elevator shaft, the safety cable having at least two load-bearing cable portions, wherein a first of the load-bearing cable portions is fixed to the lifting platform or stationarily above the lifting platform and a last of the load-bearing cable portions is guided through a cable stop device to the lifting platform;

wherein the last load-bearing cable portion is blocked by the cable stop device to prevent further lowering of the lifting platform when a speed of movement of the last load-bearing cable portion relative to the cable stop device has exceeded a specified limit; and wherein the cable pulley support has four vertically and four horizontally arranged deflection pulleys, wherein the safety cable is guided through at least one load-bearing pulley of a load-bearing pulley arrangement coupled to the lifting platform such that the safety cable forms four of the load-bearing cable portions and runs completely outside of a free space above a center of gravity of the lifting platform.

* * * * *